United States Patent [19]
Kim et al.

[11] Patent Number: 5,832,179
[45] Date of Patent: Nov. 3, 1998

[54] FLOOR HEATER WITH WATER TUBE AND THIN COPPER ELECTRIC HEATING ELEMENT INSERTED THEREIN

[75] Inventors: Du Nyun Kim, #212-1502, Dongsomoon Hanjin Apt., 616-100, Donam-dong, Seongbuk-ku, Seoul 136 060; Bu Nyun Kim, Seoul, both of Rep. of Korea

[73] Assignee: Du Nyun Kim, Seoul, Rep. of Korea

[21] Appl. No.: 714,433

[22] Filed: Sep. 16, 1996

[30] Foreign Application Priority Data

Feb. 26, 1996 [KR] Rep. of Korea ............... 1996-3997
Jul. 4, 1996 [KR] Rep. of Korea ............. 1996-27095

[51] Int. Cl.⁶ .................. H05B 3/00; F24D 13/02
[52] U.S. Cl. ................. 392/489; 219/213; 219/476
[58] Field of Search ..................... 392/488, 489, 392/491, 492, 494, 480, 481, 432, 435; 219/213, 476, 478

[56] References Cited

U.S. PATENT DOCUMENTS

| | | | |
|---|---|---|---|
| 1,438,445 | 12/1922 | Loubiere | 392/488 |
| 1,684,963 | 9/1928 | Luehrs | 392/488 |
| 1,905,343 | 4/1933 | Carpenter | 392/488 |
| 2,877,630 | 3/1959 | Schultz | 392/488 |
| 3,079,673 | 3/1963 | Loehlein et al. | 392/489 |
| 3,808,400 | 4/1974 | Cornella et al. | 219/213 |
| 4,205,719 | 6/1980 | Norell et al. . | |
| 4,408,657 | 10/1983 | Pugh . | |
| 4,542,282 | 9/1985 | Brasky . | |
| 4,564,745 | 1/1986 | Deschenes . | |
| 4,567,351 | 1/1986 | Kitagawa et al. . | |
| 4,926,026 | 5/1990 | Tarry | 219/213 |
| 5,236,765 | 8/1993 | Cordia et al. | 219/535 |
| 5,380,981 | 1/1995 | Feldman et al. | 219/219 |

FOREIGN PATENT DOCUMENTS

| | | | |
|---|---|---|---|
| 251127 | 12/1966 | Austria . | |
| 307789 | 3/1989 | European Pat. Off. | 392/489 |
| 743492 | 11/1996 | European Pat. Off. . | |
| 994870 | 11/1951 | France . | |
| 4306790 | 3/1993 | Germany . | |
| 6026232 | 2/1985 | Japan . | |
| 6080039 | 5/1985 | Japan . | |
| 60-122838 | 7/1985 | Japan . | |
| 60-162129 | 8/1985 | Japan . | |
| 60-175932 | 9/1985 | Japan . | |
| 61-98915 | 6/1986 | Japan . | |
| 61-195218 | 8/1986 | Japan . | |
| 61-240034 | 10/1986 | Japan . | |
| 63-172840 | 7/1988 | Japan . | |
| 1-196427 | 8/1989 | Japan . | |
| 1-225837 | 9/1989 | Japan . | |
| 2-279928 | 9/1990 | Japan . | |
| 4-62326 | 2/1992 | Japan . | |
| 4-84031 | 3/1992 | Japan . | |
| 4-139326 | 5/1992 | Japan . | |
| 4-208318 | 7/1992 | Japan . | |
| 4-222324 | 8/1992 | Japan . | |
| 4-278125 | 10/1992 | Japan . | |
| 5-231663 | 9/1993 | Japan . | |
| 5-248649 | 9/1993 | Japan . | |
| 626661 | 2/1994 | Japan . | |
| 14946 | 5/1989 | Rep. of Korea . | |
| 897252 | 5/1989 | Rep. of Korea . | |
| 366219 | 2/1932 | United Kingdom | 219/213 |
| 462930 | 3/1937 | United Kingdom . | |

*Primary Examiner*—John A. Jeffery
*Attorney, Agent, or Firm*—James Creighton Wray; Meera P. Narasimhan

[57] ABSTRACT

An apparatus for heating rooms with electrically heated hot water tube, and a method therefor are disclosed. The apparatus for heating rooms with electrically heated hot water tube and a method therefor are constituted such that an electrically heating line made of copper and having a diameter of 0.3–0.5 mm is inserted into a hot water tube throughout the entire length thereof, so that the heating effect of the copper wire would replace the boiler and the hot water circulating means, thereby heating the rooms with a simple structure and with a convenience without loss of thermal energy.

5 Claims, 2 Drawing Sheets

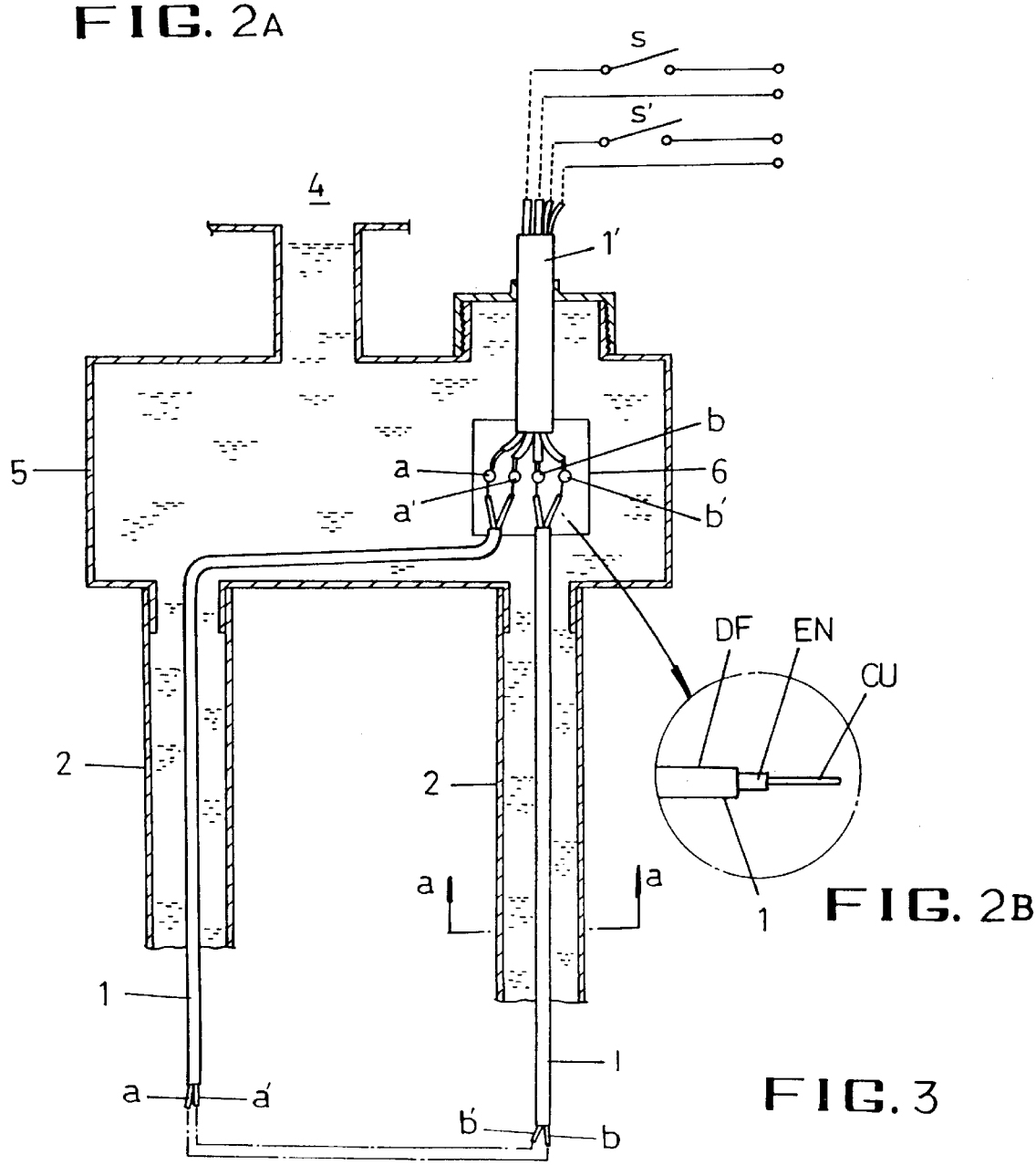
FIG. 2A
FIG. 2B
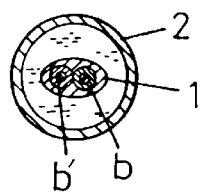
FIG. 3

FLOOR HEATER WITH WATER TUBE AND THIN COPPER ELECTRIC HEATING ELEMENT INSERTED THEREIN

FIELD OF THE INVENTION

The present invention relates to an apparatus for heating rooms with electrically heated hot water tube, and a method therefor. More specifically the present invention relates to an apparatus for heating rooms with electrically heated hot water tube and a method therefor, in which a boiler for heating water and a circulating means for the hot water are not used, but an electric heating line made of copper and having a diameter of 0.3–0.5 mm is inserted into a hot water tube throughout the entire length thereof, so that the heating effect of the copper line would replace the boiler and the hot water circulating means, thereby heating the rooms with a simple structure and with a low energy cost without loss of thermal energy.

DESCRIPTION OF THE PRIOR ART

Generally, the conventional room floor heating apparatus includes: a heat radiating means consisting of a hot water tube installed in a zig-zag form under the floor of a room; a heating means for intensively heating the water of a certain amount; and a supplying means for supplying the heated water to the hot water tube so as make the hot water circulated through the hot water tube.

The heating means includes: a boiler having an electric heater or an oil burner; a fuel supplying and spouting device; and an air blowing device.

The hot water supplying means includes: a circulating pump, a supplying tube, a water returning tube, and various valves.

Additionally there are included a water reservoir tank, an expansion tank and a temperature adjusting device.

In the conventional hot water room heating method, a large amount of water is heated by the above described means at a particular place. Then the heated water is forcibly circulated through the hot water circulating tube, so that the heat would be radiated from the hot water circulating tube. The water thus cooled is made to return to the heating means, and thus the heating of water and the radiation of heat are repeated, thereby heating the floor of a room.

In this conventional room heating apparatus, the thermal loss is very high in the pipes disposed between the heating means (boiler) and the hot water circulating tube. Further, compared with the radiating means (hot water circulating tube), the costs for the heating means and the supplying means are very high. Further, the boiler (heating means) has to occupy a separate room, because it is very bulky. Further, the heating means generates noises, and pollutes the environment. Further, the maintenance expense for the boiler is considerably high, and the use of the total room heating apparatus is inconvenient.

SUMMARY OF THE INVENTION

The present invention is intended to overcome the above described disadvantages of the conventional technique.

Therefore it is the object of the present invention to provide an apparatus for heating rooms with electrically heated hot water tube, and a method therefor, in which the structure is simple such that a boiler and a circulating pump are not used, but a hot water tube itself functions as a boiler and a heater.

In the present invention, the heating means and the hot water supplying means of the conventional technique which are complicated in the structure, inconvenient in handling, and expensive in maintenance are all eliminated. But an electrically heating copper wire which is insulated and has a diameter of 0.3–0.5 mm is inserted into a room heating tube throughout the entire length thereof. Thus owing to the heating effect of the copper wire, the hot water tube functions both as a boiler and a heater. Therefore, without polluting the environment, the heating of rooms is realized economically.

That is, in the present invention, without the boiler for heating the water and without the pump for forcibly supplying the heated water, there is used only the hot water tube which is arranged in a planar form under the floor of a room, thereby making the hot water tube serve as a heating means and as a heat radiating means.

For this purpose, a copper wire as an electrically heating means is made extend within and throughout the entire length of the hot water. Then an electric power is supplied to the copper wire so as to directly heat the surrounding water within the hot water tube, and so as for the heated water to radiate heat, thereby heating the floor of the room.

Thus the basic difference between the conventional technique and the present invention is as follows. That is, in the present invention, the water filled in the hot water tube is directly heated by means of electric power supplied to the copper wire, while in the conventional technique, there are a separate boiler to heat the water, and a pump for supplying the heated water.

That is, in the present invention, the water is not heated at a particular place, but is heated throughout the entire length of the hot water tube. Therefore, the hot water tube functions as both a heating means and as a radiator. Thus the heating means and the hot water supplying means are eliminated, and only the hot water tube exists, thereby simplifying the structure of the apparatus.

However, in the general residential houses, the length of hot water tube amounts to several scores of meters or several hundreds of meters. If the electrical resistance heating wire (nichrome wire) is installed as much as this length, its resistance value is very large, and therefore, a copper wire can be conveniently used, because the copper wire has a low resistivity.

BRIEF DESCRIPTION OF THE DRAWINGS

The above object and other advantages of the present invention will become more apparent by describing in detail the preferred embodiment of the present invention with reference to the attached drawings in which:

FIG. 2A illustrates the portion A of FIG. 1 in an enlarged scale, showing the connected form between the power line and the copper wire.

FIG. 2B is an enlarged close-up of the copper wire of FIG. 2A.

FIG. 3 is a cross-sectional view of the wire.

DESCRIPTION OF THE PREFERRED EMBODIMENT

Figure 1:
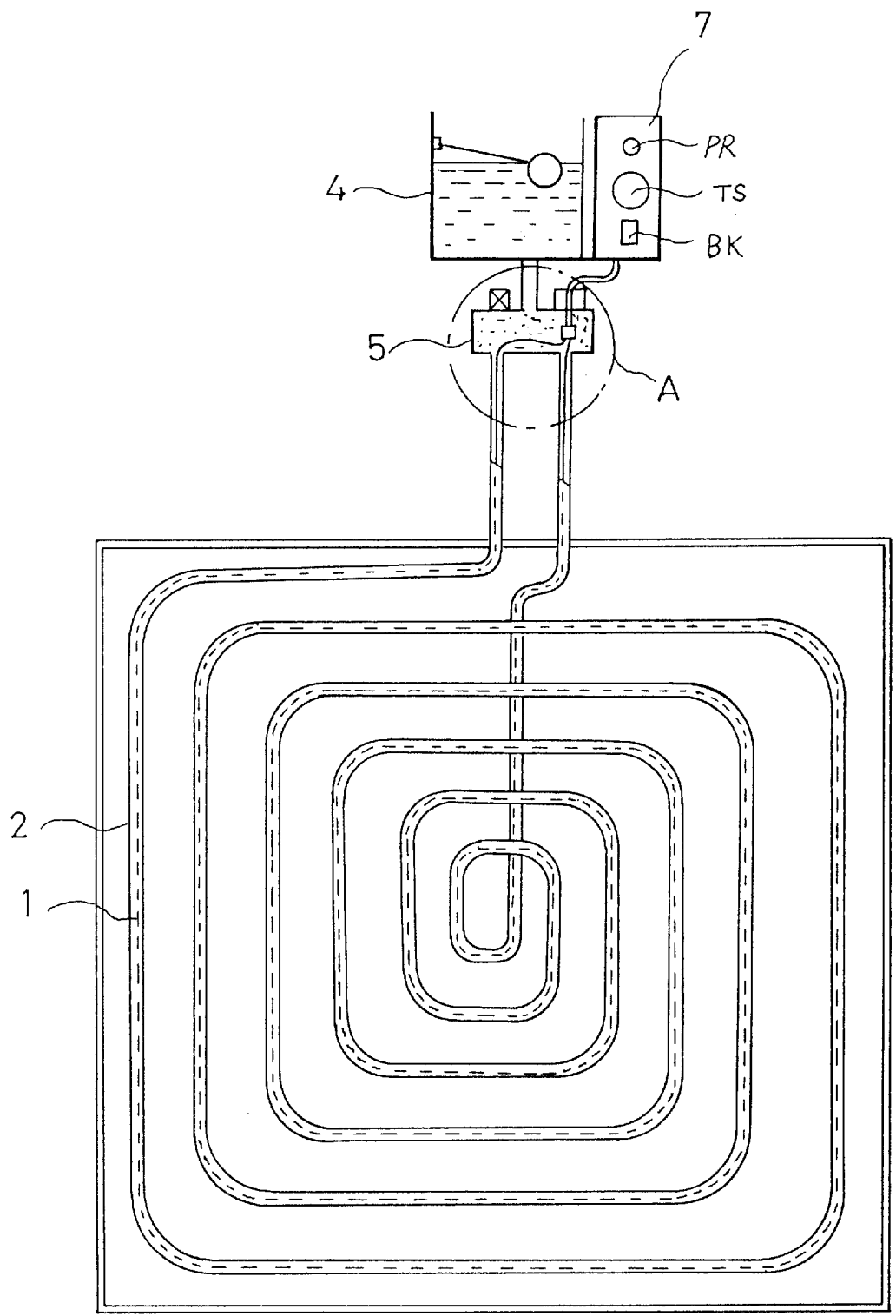
FIG. 1 illustrates an embodiment of the present invention in which an electrically heating copper wire is installed within and throughout a hot water tube.

The present inventor utilized the fact that a copper wire has a low electrical resistivity in contrast to a nichrome wire based on the Ohm's law:

$$R = \rho \frac{L}{A} \ [\Omega]$$

where R is the value of the resistance, $\rho$ is the resistivity, L is the length (m) of the wire, and A is the cross sectional area ($m^2$) of the wire.

That is, the thicker the wire and the longer the wire, the greater the resistance of the wire. Or the resistance R is proportional to the length L (m) of the wire, and is inversely proportional to the cross sectional area A ($m^2$). In other words, if a certain amount of electric current is to be made to flow through a copper wire, the copper wire has to have a predetermined thickness.

In the present invention, the copper wire which is installed throughout the hot water tube is given a small diameter compared with the standard diameter. Copper has a very low resistivity, but by utilizing the heat generation owing to the small cross sectional area, the water filled in the hot water tube is heated. Thus the object of the present invention is achieved, and the present invention is characterized in that a thin heating copper wire is used, this being unobvious in the conventional techniques.

The diameter of the copper wire which is used as a resistance heating wire in the present invention has a diameter of 0.3–0.5 mm, and has a length of about 240–440 m. The longer the wire is, the larger the diameter of the wire is. On the other hand, the shorter the length of the wire is, the smaller the diameter of the wire is. The thin copper wire is coated with enamel, and then, is clad with teflon resin, so that the final thickness of the wire would become at least 1–2 mm.

Table 1 below shows the diameter of the copper wire versus the length of the copper wire.

TABLE 1

| Diameter of copper wire (mm) | Length of copper wire (m) |
| --- | --- |
| 0.35 | 240 |
| 0.40 | 300 |
| 0.45 | 360 |
| 0.50 | 440 |

The resistivity of a copper wire at the normal temperature is as low as 1.69 $\mu\Omega$-cm. However, the copper wire is very thin and long, and therefore, the copper wire which extends throughout the entire length of the hot water tube can generate a sufficient heat energy to heat the water so as to heat the room.

The copper wire has a very low resistivity compared with the nichrome wire, and therefore, the copper wire can have much a smaller diameter compared with the nichrome wire. Therefore, the copper wire can extend throughout the entire length of the hot water tube. This fact is helpful in achieving the object of the present invention.

The indoor room temperature is raised up to about 20° C., and for this purpose, the temperature of the hot water tube has only to be 40° C. This temperature can be attained by supplying a power of 220 V (voltage)×3 A (current) for about 30 minutes. Thus the water is heated, and the radiation of heat is done from the hot water tube. Thereafter, the electric power is controlled intermittently by means of a proper temperature adjusting means, so that a constant indoor temperature can be maintained. The heat generation of the copper wire can be calculated in a simple manner based on the Joule's law, $W = I^2Rt$.

In the present invention, there is almost no heat loss, compared with the conventional technique in which the water is heated in the boiler to 70°–80° C. for maintaining the hot water tube at 40° C. Thus in the present invention, the heat utilization rate is very high, and therefore, the energy input for heating the room is smaller than the conventional technique.

Further, in the present invention, the water within the hot water tube is heated, and at the same time, the room is heated. Therefore, even when the power supply is intermittently disconnected, the hot temperature of the hot water tube is continued for a considerable time owing to the residual heat. Consequently, the power consumption is saved, and the indoor temperature is maintained at a stable level.

Further, in the present invention, not only the simplification of the room heating facility and a convenience of the use are ensured, but also the expensive components such as a boiler, a burner, a blower, a circulating pump and the like are eliminated. Further, the boiler installation space is eliminated, and the operating and maintenance costs are drastically lowered. Further, the environmental contamination due to the burnt exhaustion gas and the fuel spilling can be prevented, and the noise due to the mechanical operation is eliminated. Thus a pleasant environment can be preserved.

In the present invention, the installation of the hot water tube can be made in a zig-zag form like in the conventional technique, but more preferably, the hot water tube should be installed in a spiral form. The reason is as follows. That is, the hot water tube has the heating function and the radiating function, and therefore, if the bent angle of the hot water tube is more gentle, a temperature concentration phenomenon can be avoided. Further, after the installation of the hot water tube, a replacement is easy.

Further, an extra heating wire is installed together with the basic heating wire, so that the extra heating wire can be used if the basic heating wire is broken. The teflon resin which is clad on the copper wire should be highly heat resistant. However, the heating temperature is not high, and therefore, there is no possibility that the resin is melted or the electric power is leaked.

FIG. 1 illustrates an embodiment of the present invention, and FIG. 2A illustrates the portion A of FIG. 1 in an enlarged scale. FIG. 2B is an enlarged close-up elevation of the copper wire.

A copper wire CU having a diameter of 0.35 mm is coated with an enamel layer EN, and then, is clad with a teflon resin layer DF, as seen in FIG. 3. Thus the copper wire is securely insulated, and a plurality of such insulated copper wires 1 are clad with a teflon resin layer DF again. Then this composite wire is inserted into a hot water tube 2 having an inside diameter of about 8–10 mm, so that the composite wire would extend throughout the entire length of the hot water tube 2.

Then as shown in FIG. 1, 240 meters of the hot water tube 2 is concentrically installed in a rectangular spiral form at an interval of about 10–30 cm. The both ends of the hot water tube are connected through a water supply device 5 to a water tank 4 which is installed higher above the floor.

Further, both ends a and b of the electrically heating wire 1 which are protruded beyond the both ends of the hot water tube 2 are connected to power lines 1'. These connected portions are sealed up by means of sealing members 6, so that the connected portions would be insulated and water-tight. The power lines 1' are led to the outside of the water supply device 5 so as to be led to a temperature adjusting device 7. Each pair of the power lines 1' is provided with a switch s or s', and any one pair of them is used as a heating line, while the other one is reserved as an extra line. This extra line is to come into service if the currently heating line is broken.

Water is supplied from the water tank 4 to the hot water tube 2, and the air within the hot water tube is discharged through a discharge valve av or the water supply device (which is disposed higher). The water tank 4 is open to the external air, so that the level of the water can be shifted according to the natural trend. The temperature sensing device 7 is provided with a electric leakage blocking device bk, a pilot lamp pr and a temperature adjusting knob ts.

If the switch s is closed to receive a commercial power of 220 V, then the electrically heating line 1 which is installed within the hot water tube 2 is slowly heated. Thus when about 30 minutes are elapsed, the water within the hot water tube is heated to about 40° C. Then if the temperature adjusting device is set to a proper temperature, then the elevation of the temperature to above the set level is inhibited, so that the indoor temperature would be maintained at the proper level.

According to the present invention as described above, a slender electrically heating copper wire is installed within and throughout a hot water tube which is installed under the floor in a planar form. Thus the floor is heated by supplying electric power through the copper wire, and by heating the water within the hot water tube. Thus the hot water tube serves as a heating and radiating device so as to warm up the room. The conventional devices such a separate heating means and the supply means are eliminated, so that the structure of the room warming means is extremely simple. Further, the spaces for the separate heating means and the supply means are also eliminated so as to ensure a convenience.

Further, the temperature distribution over the floor is uniform, and the heat utilization rate is improved. Further, the installation costs for the eliminated means such as the heating means and the hot water supply means are saved, while the operating and maintenance costs are also reduced. If the midnight electric service is utilized, the overall expense for heating the rooms will be drastically curtailed.

Further, owing to the simple structure and the handling convenience, the room heating will become more convenient.

What is claimed is:

1. A method for heating rooms with an electrically heated hot water tube comprising providing a hot water tube under a floor of a room, providing a copper wire comprising a primary heating wire and a plurality of reserve heating wires within and throughout the hot water tube, insulating the copper wire and electrically isolating the copper wire, connecting an electrical power source to the copper wire for heating hot water in the hot water tube and radiating heat when electric power is applied to the copper wire.

2. In a room with a floor an apparatus for heating the room with an electrically heated hot water tube comprising a hot water tube installed under the floor of the room in a planar form, an electrically heating copper wire having a primary and plural reserve wires provided within and throughout the hot water tube, insulation on the copper wire for electrical isolation, an electric power source connected to the copper wire, wherein the electrically heating copper wire heats water within the hot water tube for radiating heat in the room.

3. The apparatus of claim 2, wherein the copper wire has a diameter of about 0.3–0.5 mm, and a length of about 240–440 m.

4. The apparatus of claim 2, further comprising watertight insulation on the copper wire at a connection between the electric power source and the copper wire.

5. A floor having a heater with an electrically heated hot water tube installed in a planar zigzag form under the floor of a room comprising a water tank installed above the floor, ends of the hot water tube being connected to the water tank, a copper wire of 0.3–0.5 mm thickness provided in the water tank as an electric heating element, wherein the length of the hot water tube is at least 240–440 m, the hot water tube comprising a main copper-wire electric heating element and at least one spare copper-wire electric heating element inserted in the hot water tube throughout from one end to another end of the hot water tube.

\* \* \* \* \*